(12) United States Patent
Morgeneyer et al.

(10) Patent No.: US 8,211,549 B2
(45) Date of Patent: Jul. 3, 2012

(54) COATING AGENT WITH DOUBLE CROSS-LINKING

(75) Inventors: Thomas Morgeneyer, Bopfingen (DE); Michael Thomas, Monheim (DE); Thomas Möller, Düsseldorf (DE); Helga Garmann, Hilden (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/814,574

(22) Filed: Jun. 14, 2010

(65) Prior Publication Data

US 2010/0323209 A1 Dec. 23, 2010

Related U.S. Application Data

(63) Continuation of application No. PCT/EP2008/063232, filed on Oct. 2, 2008.

(30) Foreign Application Priority Data

Dec. 13, 2007 (DE) .......................... 10 2007 060 536

(51) Int. Cl.
- *B32B 27/08* (2006.01)
- *B32B 21/04* (2006.01)
- *B05D 1/40* (2006.01)
- *B05D 3/02* (2006.01)

(52) U.S. Cl. ..................... 428/515; 428/537.1; 427/331; 427/372.2

(58) Field of Classification Search ........................ None
See application file for complete search history.

(56) References Cited

U.S. PATENT DOCUMENTS

| | | | | |
|---|---|---|---|---|
| 6,894,115 | B2 * | 5/2005 | Botros | ........................ 525/101 |
| 7,156,944 | B2 | 1/2007 | Moeller et al. | |
| 2004/0250906 | A1 | 12/2004 | Becker-Weimann et al. | |
| 2006/0099338 | A1 | 5/2006 | Boelz et al. | |

FOREIGN PATENT DOCUMENTS

| | | |
|---|---|---|
| CA | 2381628 A1 | 2/2001 |
| DE | 4439350 C2 | 4/1996 |
| WO | 0110914 A1 | 2/2001 |

OTHER PUBLICATIONS

Römp-Lexikon, "Reaktivverduenner" Lacke and Druckfarben, Georg Thieme Verlag, Stuttgart, 1998, p. 491.

* cited by examiner

*Primary Examiner* — Sheeba Ahmed
(74) *Attorney, Agent, or Firm* — Sun Hee Lehmann

(57) ABSTRACT

Coating agent for wooden or plastic surfaces containing 30 to 80% by weight of a polyolefin comprising at least two alkoxysilane groups, 5 to 40% by weight of at least one compound comprising (meth)acryl groups having 1 to 10 radiation-reactive groups, 0.1 to 6% by weight catalysts and initiators, 0 to 50% by weight adjuvants, selected from resins, adhesion promoters, stabilizers, pigments/fillers, softeners, waxes, thermoplastic polymers or water-binding agents, wherein the coating agent is solid at room temperature and can be cross-linked by actinic radiation and by moisture.

17 Claims, No Drawings

COATING AGENT WITH DOUBLE CROSS-LINKING

This application is a continuation of International Application No. PCT/EP2008/063232 filed Oct. 2, 2008, which claims the benefit of German Patent Application No. 10 2007 060 536.8 filed Dec. 13, 2007.

The invention relates to a coating agent for coating wood and plastic surfaces. A multiple coating is also described, along with a method for preparing a coated wood or plastic surface.

DE 10234369 describes radiation-crosslinking pressure-sensitive adhesives which contain a non-radiation-crosslinkable elastomer, along with a compound containing at least two olefinic double bonds, and also tackifying resins. Acrylates, ethylene-vinyl acetate polymers, styrene copolymers or ethylene/propylene copolymers are described as non-radiation-crosslinking elastomers. These are non-reactive polymers. Polymers obtainable by polymerization of diolefins are described as the compound having at least two olefinic double bonds. Such hot-melt adhesives crosslink under irradiation, for example UV radiation, after being applied.

DE 19937341 describes the use of UV-reactive hot-melt adhesives which in addition to the radiation-curing constituents contain non-radiation-curing polymers with NCO groups. These NCO groups are supposed to crosslink under moisture following a reaction of the double bonds.

WO 01/10914 describes polymers grafted with silane groups, the polymer base consisting of polyethylene or of ethylene/α-olefin copolymers with vinyl aromatic constituents. Water-crosslinkable polymer materials can be prepared from these polymers.

WO 02/094549 describes sealing materials for the coating of veneers, these materials being polyurethane-based hot-melt adhesives which crosslink under atmospheric moisture. This sealing layer contains no further crosslinking polymers.

Various compositions which can crosslink via silane groups are described in the prior art. These are moisture-crosslinking systems, but they react relatively slowly. Isocyanate-crosslinking systems are also known. These contain reactive isocyanates including, because of the manufacturing process, those in monomeric form. Such monomeric isocyanates represent a health hazard to users during processing. If radiation-crosslinking coating systems are used, they are frequently low-viscosity systems. This requires careful pretreatment of the substrate if a good surface appearance of the product is to be achieved. Moreover, adhesion to differing substrate surfaces is in many cases problematic.

The object of the present invention is therefore to provide a coating system which guarantees rapid crosslinking in order to allow further processing of the coated parts. Furthermore, good adhesion to the adjacent layers and a high elasticity should be ensured by means of a second crosslinking reaction. The coating should react without sensitivity to different substrate surfaces. Moreover, the polymer components must be compatible with one another to ensure a stable application in the melt.

The object is achieved by a coating agent for wood or plastic surfaces, containing 30 to 80 wt. % of a polyolefin having at least two alkoxysilane groups, 5 to 40 wt. % of at least one compound having (meth)acrylic groups and 1 to 10 radiation-reactive groups, 0.1 to 6 wt. % of catalysts and initiators, and 0 to 50 wt. % of auxiliary substances, selected from resins, adhesion promoters, stabilizers, pigments/fillers, plasticizers, waxes, thermoplastic polymers and/or water-binding agents, the coating agent being solid at room temperature and being crosslinkable by actinic radiation and by moisture.

Polyolefin homopolymers or copolymers are suitable as polyolefins which must have at least two alkoxysilane groups in the polymer. These should be solid, meltable polymers which are suitable as base polymers for hot-melt adhesives. The silane-functional groups can be incorporated by polymerization directly during production or they are introduced subsequently by means of grafting reactions. Ethylene, propylene and/or $C_4$ to $C_{12}$-α-olefins and similar copolymerizable monomers, for example, are suitable as monomers for the polymer backbone. A suitable class of polymers for the invention additionally contains during production proportions of monomers having unsaturated hydrolyzable silane groups. These are then incorporated into the polymer chain and produce silane-functionalized copolymers. If a suitable copolymerization technique is used it is also possible to obtain polymers having silane end groups. Another class comprises polymers from the aforementioned monomers which are subsequently modified by reaction with such silane-functional groups.

APAO polymers (atactic poly-alpha-olefins) are particularly suitable as alkoxysilane-modified polyolefins. These are copolymers having two, three or more different monomers, for example ethene, propene, butene, pentene, hexene, 4-methylpentene-1, octene-1, decene-1 or other $C_4$ to $C_{12}$-α-olefins. Olefin copolymers are produced from these by radical polymerization. These copolymers can be grafted in a further reaction step with such alkoxysilanes which additionally contain an unsaturated double bond. The silanes should contain two or three hydrolyzable $C_1$ to $C_4$ alkoxy groups. Examples of such silanes are vinyl trimethoxysilane, vinyl triethoxysilane, vinyl-tris(2-methoxyethoxy)silane, vinyl dimethyl methoxysilane, vinyl triacetoxysilane, (methacryloxymethyl)trimethoxysilane, 3-methacryloxypropyl triethoxysilane, 3-methacryloxypropyl trimethoxysilane, (methacryloxymethyl)methyl diethoxysilane, (methacryloxymethyl)triethoxysilane or 3-(methacryloxypropyl)methyl dimethoxysilane. Such polymers are known in the literature, for example in DE-OS 29 30 108, and are also available commercially.

It is likewise possible to graft such APAO polymers with other monomers having a carboxyl group or anhydride group. Such monomers are for example acrylic and methacrylic acid, itaconic acid, crotonic acid, aconitic acid, maleic anhydride, fumaric acid and derivatives thereof, such as for example esters, semi-esters or anhydrides. Moreover, such carboxyl-group-containing polyolefins have a reduced melt viscosity and an improved adhesion to many substrates. These carboxyl groups can subsequently be reacted with alkoxysilanes which additionally have a nucleophilic group. Examples of such silanes are aminoalkyl trialkoxysilanes or aminoalkyl methyl dialkoxysilanes, with methanol, ethanol, propanol or butanol as the alkoxy group and $C_2$ to $C_6$ residues as the alkyl group. In this case too suitable silane-substituted polyolefin copolymers are obtained. All carboxyl groups can be reacted here, but it is also possible to react only portions of these groups.

A further group of base polymers are polyolefins from the aforementioned copolymerizable monomers which are prepared by metallocene catalysis. These are in particular also poly-α-olefins from ethylene, propylene and $C_4$ to $C_{12}$-α-olefins. Particularly favorable molecular weight distributions are obtained through the selected catalysts, such that these polyolefins have a low viscosity. Such polymers can likewise be reacted subsequently with the aforementioned silane-containing monomers.

The content of silane monomers in these modified polymers or the mixtures of these polymers should be in the range from 1 to 10 wt. %, with a content of 3 to 7 wt. % being preferred. The polymer chain should preferably contain 2 or more, up to approximately 20, silane groups, in particular up to approximately 10 silane groups. These silane-functionalized polymers should be meltable at temperatures of over 60 to 150° C. The viscosity can be from 1000 to 200,000 mPas at temperatures of 130 to 200° C. (measured with a Brookfield RVT, EN ISO 2555, at the stated temperature).

According to the invention the coating agent must contain radiation-curable compounds. Radiation-activatable reaction products of (meth)acrylic acid with alcohols or with NCO-group-containing low-molecular-weight compounds are suitable as compounds having (meth)acrylic groups. These are reaction products having a molecular weight of less than 3000 g/mol, in particular less than 2000 g/mol (number-average molecular weight, $M_N$, as can be determined by GPC).

They can be mono-, di- or higher-functional acrylate or methacrylate esters, for example. Such acrylate or methacrylate esters include for example esters of acrylic acid or methacrylic acid with aromatic, aliphatic or cycloaliphatic polyols or with polyether alcohols.

Esters of (meth)acrylic acid with monohydric alcohols can be used for example as monofunctional acrylate esters. These are aliphatic and/or aromatic alcohols having one OH group, for example. The number of C atoms can be between 1 and 30 C atoms. Examples of such alcohols are methanol, ethanol, propanol, butanol, hexanol, octanol, decanol or isomers thereof, alkyl phenols, such as nonyl phenols, monofunctional low-molecular-weight polyethers, such as monolaterally etherified polyethylene, polypropylene, polybutylene ethers having up to 10 repeating units. Such alcohols can be reacted to the corresponding esters with (meth)acrylic acid by methods known to the person skilled in the art. Examples of such compounds are 2-ethylhexyl acrylate, octyl/decyl acrylate, isobornyl acrylate, 3-methoxybutyl acrylate, 2-phenoxyethyl acrylate, benzyl acrylate or 2-methoxypropyl acrylate.

A large number of polyols can be used as polyols for the preparation of polyfunctional (meth)acrylate esters. These are for example aliphatic polyols having 2 to 4 OH groups per molecule and 2 to around 30 C atoms. Suitable aliphatic polyols are for example ethylene glycol, propanediol-1,2 or -1,3, butanediol-1,4, butanediol-2,3, butanediol-2,3, butenediol-1,4, pentanediol-1,5, pentenediols, hexanediol-1,6, octanediol-1,8, dodecanediol and higher homologs, isomers and mixtures of such compounds. Likewise suitable are higher-functional alcohols such as for example glycerol, trimethylolpropane, pentaerythritol or sugar alcohols, such as sorbitol or glucose, and oligomeric ethers or reaction products with ethylene or propylene oxide. The reaction products of low-molecular-weight polyfunctional alcohols with alkylene oxides, known as polyether polyols, can also be used as polyol components for preparing the (meth)acrylate esters. The alkylene oxides preferably have two to around four C atoms. The reaction products of ethylene glycol, propylene glycol, glycerol, trimethylolethane or trimethylolpropane, pentaerythritol with ethylene oxide, propylene oxide or butylene oxide or mixtures thereof, for example, are suitable.

Examples of such (meth)acrylate esters are neopentyl glycol di(meth)acrylate, 1,8-octanediol di(meth)acrylate, butanediol di(meth)acrylate, 1,6-hexanediol di(meth)acrylate, trimethylolpropane tri(meth)acrylate, pentaerythritol tetra(meth)acrylate, and (meth)acrylate esters of sorbitol and other sugar alcohols, ethylene oxide-modified neopentyl glycol di(meth)acrylates, propylene oxide-modified neopentyl glycol di(meth)acrylates, ethylene oxide-modified 1,6-hexanediol di(meth)acrylates or propylene oxide-modified 1,6-hexanediol di(meth)acrylates, polyethylene glycol di(meth)acrylates, polypropylene glycol di(meth)acrylates, pentaerythritol tri(meth)acrylate, dipentaerythritol tetra(meth)acrylate, tris[(meth)acryloxyethyl]isocyanurate, polyethylene glycol di(meth)acrylates or mixtures thereof.

Reaction products based on polyether polyols or polyalkylene diols with (meth)acrylic esters having a molecular weight ($M_N$) of 200 to 3000 g/mol, preferably of 300 to 2000 g/mol, in particular up to approximately 1000 g/mol, are particularly suitable.

A further group of suitable compounds having (meth)acrylic groups are polyurethane (meth)acrylates. These are reaction products of alcohols, in particular monoalcohols, diols and/or triols, with di- or triisocyanate compounds. The proportions are chosen such that terminally NCO-functionalized oligomers are obtained. The prepolymers should in particular be linear, i.e. be prepared predominantly from monoalcohols or diols and diisocyanates. An additional use of small proportions of trifunctional polyols or isocyanates is possible. Such PU oligomers can then be reacted with OH-reactive (meth)acrylic compounds to form suitable functionalized PU oligomers.

The monomeric di- or triisocyanates known for adhesive use can be used as a starting compound. Examples of suitable monomeric polyisocyanates are 1,5-naphthylene diisocyanate, 2,2'-, 2,4- and/or 4,4'-diphenylmethane diisocyanate (MDI), hydrogenated MDI (H12MDI), xylylene diisocyanate (XDI), tetramethyl xylylene diisocyanate (TMXDI), 4,4'-diphenyldimethyl methane diisocyanate, 4,4'-dibenzyl diisocyanate, 1,3-phenylene diisocyanate, 1,4-phenylene diisocyanate, toluoylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane-1,4-diisocyanate, hexane-1,6-diisocyanate (HDI), dicyclohexyl methane diisocyanate, cyclohexane-1,4-diisocyanate, ethylene diisocyanate, trimethyl hexamethylene diisocyanate, 1,4-diisocyanatobutane, 1,12-diisocyanatododecane, dimer fatty acid diisocyanate, or uretdione, biuret or isocyanurates of diisocyanates.

Suitable for use as a polyol for such PU oligomers are for example low-molecular-weight oligomers, selected from polyester, polyether, polycarbonate, polyacetal polyols having terminal OH groups, or aliphatic or aromatic monohydric to trihydric alcohols having a molecular weight ($M_N$) of approximately 200 to 2000 g/mol (number-average molecular weight, $M_N$, as can be determined by GPC), in particular up to 1000 g/mol. Such polyols are known to the person skilled in the art and are available commercially. Examples thereof are ethanol, propanol, butanol, hexanol, octanol and higher homologs, alkyl phenols, ethylene glycol, propanediol, butanediol and higher homologs, polyethylene glycol or polypropylene glycol.

The reaction of the polyols with the polyisocyanates can take place in a known manner, for example in the presence of solvents; a solvent-free method is preferably used, however. To accelerate the reaction the temperature is conventionally raised, for example from 40 to 80° C. Catalysts conventionally used in polyurethane chemistry can optionally be added to the reaction mixture to accelerate the reaction.

In a further reaction all NCO groups are then reacted with compounds bearing a functional group which can react with isocyanates and having as a further functional group a double bond which can crosslink by radical polymerization. These conventionally have a molecular weight of less than 1000 g/mol.

Examples of such compounds are esters of α-β-unsaturated carboxylic acids with low-molecular-weight, in particular aliphatic, alcohols bearing a further OH group in the alkyl residue. Corresponding esters bearing OH groups are for example 2-hydroxyethyl (meth)acrylamide, 2-hydroxyethyl (meth)acrylate, 2-hydroxypropyl(meth)acrylate, 3-hydroxypropyl(meth)acrylate, 3-hydroxypropyl(meth)acrylamide, N-hydroxyethyl (meth)acrylamide, reaction products of glycidyl ethers or esters with acrylic or methacrylic acid, partial interesterification products of polyalcohols, such as pentaerythritol, glycerol or trimethylolpropane, with (meth) acrylic acid.

Polymers or oligomers which can contain up to 10 radiation-reactive groups are suitable as the radiation-reactive compound; oligomers bearing 2 to 5 reactive groups should preferably be present, however, optionally also as a mixture.

Wax, resins, adhesion promoters, catalyst, stabilizers, photoinitiators, flow control agents, pigments or other known auxiliary substances can be included as additives.

Photoreactive substances are preferably additionally included in the radiation-crosslinkable coating agent. 0 to 6 wt. % of at least one photoinitiator, photosensitizer and/or regulator molecule can be added. No initiator is necessary for electron beam crosslinking. In the preferred case of irradiation with UV radiation at least one photoinitiator is contained in the coating agent according to the invention in an amount of 0.1 wt. % to 5 wt. %, preferably 0.5 wt. % to 3 wt. %. In the context of the present invention all commercial photoinitiators which are compatible with the coating agent according to the invention, i.e. which produce predominantly homogeneous mixtures, are suitable in principle.

The photoinitiators are substances or mixtures of substances which under the action of radiation can initiate radical or ionic polymerization reactions, in particular under UV radiation of 200 to 400 nm. Radical polymerization reactions are initiated for example by the decomposition of peroxides, disulfides, benzoin derivatives and aliphatic ketones. Photoinitiators from the group of benzoin and derivatives, phenylhydroxy alkanone and thioxanthone derivatives, for example benzophenone, 2,4,6-trimethyl benzophenone, 4-methyl benzophenone or mixtures of alkyl benzophenone, camphor quinone or other commercial initiators are suitable, for example. Amine-free and hydroxy-free initiators are also particularly suitable, such as for example oxyphenyl acetic acid 2-[2-oxo-2-phenyl acetoxyethoxy]ethyl ester; oxyphenyl acetic acid 2-[2-hydroxyethoxy]ethyl ester; bis-(2,4,6-trimethylbenzoyl)phenyl phosphine oxide; 1-hydroxycyclohexyl phenyl ketone; 2,2-dimethoxy-1,2-diphenylethan-1-one; 2,4, 6-trimethylbenzoyl diphenyl phosphine oxide or phenyl glyoxylic acid methyl ester.

Organometallic catalysts are suitable as catalysts for the moisture-sensitive crosslinking of the silane groups. These can be lead, titanium, iron, zinc or tin compounds. Tin(II) or tin(IV) compounds are preferred, in particular salts of organic carboxylic acids. Examples are tin(II) acetate, zinc acetate, zinc octoate, lead phenylethyl dithiocarbaminate, iron acetyl acetonate, iron octoate, di-n-octyl tin mercaptide, dibutyl tin maleate, dibutyl tin diethyl hexoate, dibutyl tin dilaurate, dibutyl tin diketonate, dibutyl tin diacetyl acetonate or corresponding dioctyl tin compounds. The amount can be from 0.01 to 3 wt. %, in particular 0.1 to 1 wt. %.

Added resins bring about an additional tackiness and improve the compatibility of the components. They are used in an amount of 0 to 40 wt. %, preferably up to 20 wt. %. Examples are aliphatic or alicyclic petroleum hydrocarbon resins and hydrogenated derivatives, hydroabietyl alcohol and esters thereof, in particular esters thereof with aromatic carboxylic acids such as terephthalic acid and phthalic acid, modified natural resins such as resin acids of gum rosin, tall oil resin or wood rosin, for example completely saponified gum rosin or alkyl esters of optionally partially hydrogenated colophony having low softening points, such as for example methyl, diethylene glycol, glycerol and pentaerythritol esters, terpene resins, in particular terpolymers or copolymers of terpene, such as styrene terpenes, alpha-methyl styrene terpenes, phenol-modified terpene resins and hydrogenated derivatives thereof; acrylic acid copolymers, preferably styrene-acrylic acid copolymers, and resins based on functional hydrocarbon resins. Aromatic, aliphatic or cycloaliphatic hydrocarbon resins and modified or hydrogenated versions thereof are preferably used.

Waxes can optionally be added to the coating agent. The amount should be from 0 to 30 wt. %, in particular from 1 to 15 wt. %. The wax can be of natural, chemically modified or synthetic origin. Non-polar vegetable waxes, mineral waxes, petrochemical waxes and Sasol waxes can be used. Examples are polyalkylene waxes, petroleum jelly, paraffin waxes, microwaxes, in particular polyethylene, polypropylene or Fischer-Tropsch waxes. The melting point of the waxes should be from 60 to 140° C., in particular from 100 to 130° C. (measured by DSC).

Plasticizers can likewise be included. The amount is up to 20 wt. %, preferably from 0 to 10 wt. %. Suitable plasticizers are medical white oils, naphthenic mineral oils, phthalates, adipates, polypropylene, polybutene, polyisoprene oligomers, hydrogenated polyisoprene and/or polybutadiene oligomers, benzoate esters, vegetable or animal oils and derivatives thereof.

Non-reactive, fine-particle inorganic minerals are suitable as fillers and/or pigments; these can be ground, precipitated or surface-treated. Examples are chalk, coated chalk, lime dust, calcium magnesium carbonates, aluminum oxides and hydroxides, precipitated silica, titanium dioxide, barium sulfate, sodium or aluminum silicates, zeolites, bentonites, glass, hollow beads, ground minerals, provided they are in powder form. The particle size should be between 1 and 200 μm, in particular between 3 and 50 μm. Added zeolites can simultaneously act as desiccants. Nanoscale fillers, based for example on $SiO_2$ or $TiO_2$, can also be used. As moisture-reactive groups are present in the coating agent, the pigments and fillers should be dry. The choice and amount should be determined such that the necessary radiation-induced reaction is not adversely affected.

Stabilizers, in particular UV stabilizers, or antioxidants suitable for use as additives in the context of the invention include phosphites, phenols, sterically hindered phenols of high molecular weight, polyfunctional phenols, sulfur- and phosphorus-containing phenols or amines.

Further non-reactive thermoplastic polymers can also be added to the coating agent according to the invention in small amounts of up to a maximum of 10 wt. %. These further polymers can influence properties of the coating agent, such as cohesion, viscosity, adhesion, elasticity. They can be polymers known to the person skilled in the art, such as ethylene-vinyl acetate copolymers, styrene-olefin block copolymers, polyacrylates or non-reactive polyolefins.

In a particular embodiment a vinyl silane, which is bifunctional, such that a radiation-activatable crosslinking is possible via the vinyl group and a moisture-sensitive crosslinking is possible via the silane group, can additionally be added to the coating agent. Examples of suitable compounds are vinyl tris(2-methoxyethoxy)silane, 3-methacryloxypropyl trimethoxysilane, 3-methacryloxypropyl triethoxysilane, vinyl dimethyl methoxysilane; vinyl triacetoxysilane, (methacryloxymethyl)methyl dimethoxysilane; (methacryloxymethyl) trimethoxysilane, (methacryloxymethyl)methyl diethoxysilane or (meth)acryloxymethyl triethoxysilane. Trimethoxy or triethoxy vinyl silane is preferred. The content of these silanes should be from 0.5 to 10 wt. %, preferably from 3 to 7 wt. %.

A coating agent according to the invention can be produced from the aforementioned constituents by known methods. The functionalized polyolefin is conventionally melted and then the other components are added. As moisture-sensitive substances are added, it is convenient to ensure that the raw materials used have a low water content. After cooling, hot-melt adhesives which are solid at room temperature are obtained, which can then be packaged.

The constituents are selected such that the coating agent has a viscosity of 1000 to 100,000 mPas at a temperature of 140° C., in particular 3000 to 50,000 mPas. This is stable in storage in the absence of moisture. The coating agent has the physical form of a hot-melt adhesive and can therefore be processed by the known methods.

Wood and plastic substrates can be used as substrates. They can be dimensionally stable moldings, in particular also flexible substrates such as veneers or edging strips. These can consist of wood, wood materials, such as chipboards or MDF boards, fiberboards, veneer films, plastics or plastic films. They can also be multi-layer substrates.

The coating agent according to the invention can be used as a surface coating for substrates of wood materials or plastic substrates. The coating methods for such substrates are known. The coating agent according to the invention is melted and applied to the surface by known methods. This can be done for example by extrusion through a slot die, by spray application, by roller application or by knife application.

Immediately after application it is optionally also possible for the applied layer to be additionally smoothed. This can be done by means of known measures, such as rollers or sliding blocks. Another possible procedure liquefies the surface of the coating agent by briefly heating the surface, for example by IR radiation.

No pretreatment of the substrate surface is necessary. It must merely be free from particles in dust form and be grease-free. Possible irregularities, pores or voids do not need to be eliminated or covered with a primer.

After cooling the coating, a non-crosslinked, smooth surface is obtained. Possible irregularities in the substrate are covered. The film thickness of the coating should be up to 250 µm, in particular from 5 to 100 µm. The coating can optionally be crosslinked by actinic radiation.

A preferred manner of execution also applies a radiation-curable liquid protective coating agent to the uncrosslinked coating, however. These can be the radiation-curing protective coating agents known in the industry, which can be formulated on the basis of unsaturated compounds, photoinitiators, and further auxiliary substances. Examples of such radiation-curing protective coating agents are described in DE 2838691 and in DE 4439350. In particular they are protective coating agents which are liquid at the application temperature. Protective coating agents which for example have a low viscosity at room temperature can be used. These are mostly colorless or at least transparent.

These protective coating agents known to the person skilled in the art are applied by the usual methods, for example by roller application, roll coating, printing, spraying or flow coating. The film thickness can vary within broad limits, for example from 5 to 250 µm, in particular up to 100 µm.

After application of the coating agent and the second radiation-curable protective coating agent, the two layers are crosslinked together. This is possible through the action of actinic radiation on the coating. This can be electron beam radiation, for example, but UV rays are particularly suitable.

The term "radiation-crosslinkable" within the context of the present invention is understood to mean the initiation of a polymerization reaction under the influence of radiation. Radiation is understood here to mean any type of radiation which brings about an irreversible crosslinking in the crosslinkable layer to be irradiated.

Within the context of this invention crosslinking by UV radiation is preferred. Irradiation of the coating agent according to the invention with UV light takes place at a wavelength in the range from 100 nm to 380 nm. The UV rays are generated by known devices.

After crosslinking by irradiation a substrate is obtained which has a mechanically stable surface coating. This substrate can then be machined, packaged or processed further. When stored under conventional conditions, the lower layer of the coating agent undergoes post-crosslinking. Atmospheric moisture is absorbed from the surroundings or from the substrate, and this moisture leads to a crosslinking of the hydrolyzable alkoxysilane groups. The additional crosslinking increases the mechanical stability of the coating. Adhesion to the substrate is improved. The two different crosslinking mechanisms give rise to two different networks, which are interpenetrated. This makes it more difficult for constituents to separate or to migrate. In the embodiment in which additional components are included which contain radiation-crosslinkable groups and water-reactive silane groups, it is optionally possible to connect these two networks.

The coating of moldings based on wood and/or plastic substrates with the coating agent according to the invention achieves an improvement in the fabrication process. Pretreatment of the surfaces can be kept to a minimum. Furthermore, the rapid curing by radiation-curing polymers ensures that an adequate mechanical stability of the surface coating is achieved. The coated substrate can then be sent immediately for further processing. Final curing of the coating takes place with a second, later crosslinking reaction. Moreover, the adhesion of the coating agent to the adjacent layers, such as the substrate and a further paint film, is increased by selecting a polymer having hydrolyzable silane groups. No delamination is observed, even during storage or under exposure to moisture. The selection of a crosslinking system which is common to the coating agent and the further protective coating agent ensures that the two layers adhere well to one another. No delamination is observed at this boundary layer either.

Irregularities and pores in the substrate can be evened out by the use of a melting coating agent. The coating has a high mechanical resistance to pressure. The low viscosity at the application temperature allows a self-leveling, smooth finish to be achieved with the coating agent. A further advantage is that in principle two different networks are formed in the curing coating. This achieves an increased elasticity, which leads to better results even during subsequent further processing and shaping of the coated substrates, for example of veneer substrates.

EXAMPLES

Example 1

Comparative Example

| | |
|---|---|
| 60 parts of silane-modified APAO | (Vestoplast 209, Degussa) |
| 30 parts of $C_5$ hydrocarbon resin | (Escorez 1102, Exxon) |
| 9 parts of PE wax | (Licowax PE 130, Clariant) |
| 0.95 parts of aminosilane | |
| 0.05 parts of DBTL | |

The modified APAO is melted with the hydrocarbon resin and mixed and then the other constituents are added and stirred together. The viscosity is 30,000 mPas at 140° C.

A veneer is coated with the mixture at a temperature of 140 to 150° C. using a heated roller. A rate of application of 70 g/m² should be achieved.

The coating is coated with a UV-curable commercial acrylate paint at a rate of 30 g/m² and then crosslinked using a UV radiation source (25/min, 200 W/cm).

Example 2

| | |
|---|---|
| 60 parts of silane-modified APAO | (Vestoplast EP 2412, Degussa) |
| 10 parts of $C_9$ hydrocarbon resin | (Arkon P 125, Arkema) |
| 5 parts of PE wax | (Licowax PE 130, Clariant) |
| 7 parts of $C_2/C_8$ olefin | (Exact 8230, Exxon) |
| 15 parts of ethoxylated trimethylolpropane triacrylate | |
| 2 parts of UV initiator | (Irgacure 819) |
| 0.5 parts of aluminum silicate | |
| 0.4 parts of aminosilane | |
| 0.1 parts of DBTL | |

The modified APAO is melted together with the hydrocarbon resin and mixed and then the other constituents are mixed in. The mixing temperature is approximately 130 to 140° C. The viscosity is 25,000 mPas at 140° C.

The mixture is crosslinked for 7 days under atmospheric moisture. It has a strength of 3 MPa.

After UV irradiation and moisture-curing in an analogous manner the tensile strength is 5.5 MPa.

A veneer is coated with the uncrosslinked material at a temperature of 130 to 140° C. using a slot die. The rate of application is 60 g/m². A UV-crosslinkable acrylate paint (30 g/m²) is applied to the coating. It is cured with a UV radiation source in a manner analogous to that of experiment 1.

Example 3

| | |
|---|---|
| 54 parts of silane-modified APAO | (Vestoplast EP 2412, Degussa) |
| 10 parts of hydrogenated hydrocarbon resin | (Arkon P 100, Arkema) |
| 5 parts of PE wax | (Licowax PE 130, Clariant) |
| 7 parts of $C_2/C_8$ copolymer | (Exact 8230, Exxon) |
| 13 parts of ethoxylated trimethylolpropane triacrylate | |
| 3 parts of UV initiator | (Irgacure 754) |
| 6.85 parts of vinyl triethoxysilane | |
| 0.15 parts of DBTAA | |
| 1 part of aluminum silicate | |

The constituents are mixed together by the method described above. They are stable when stored with exclusion of moisture.

The viscosity is 18,000 mPas at 140° C.

A test piece of this mixture has a mechanical tensile strength of 3.3 MPa after crosslinking under atmospheric moisture and of approximately 6 MPa after additional preceding UV crosslinking.

A coating of this mixture is applied to a substrate at a temperature of 120 to 130° C. using a beading die. The rate of application is 50 g/m².

A UV-crosslinkable acrylate paint (30 g/m²) is applied to this layer immediately afterwards. The two coatings are crosslinked together using a UV radiation source.

The characteristic values for Examples 1 to 3 are set out in the table below:

| | Example: | | |
|---|---|---|---|
| | 1 (comparative example) | 2 | 3 |
| Cohesion between layers (Crosshatch adhesion) | 50% cohesive failure; 50% adhesive failure | No failure between the two layers | No failure between the two layers |
| Tensile strength (immediate, MPa) | 0.5 | 0.5 | 0.5 |
| Tensile strength (7 d storage under moisture, MPa) | 2.5 | 3 | 3.3 |
| Tensile strength (7 d storage under moisture and UV curing, MPa) | 2.5 | 5.5 | 6 |
| DMA - tensile test (elongation at 120° C./film break at X° C.) | 100%/125° C. | 45%/no film break up to 150° C. | 30%/no film break up to 150° C. |

Cohesion Between Layers:

A coated and crosslinked flat substrate is cross-hatched. A piece of adhesive tape is applied to the scratched coating and pulled off sharply at right angles to the surface. The signs of detachment are visually assessed.

Tensile Strength:

Test pieces are produced from the crosslinkable compositions and crosslinked as described in the examples.

The tensile strength is determined in accordance with EN ISO 527.

DMA Tensile Test

The mechanical linear expansion of a film under the influence of temperature and the action of a constant force is measured.

TA Instruments DMA 2980 Device:
  Oscillation with tensioning clamp
  Initial temperature 30° C.
  Isothermal waiting time before start of measurement 10 min
  Measurement until test piece breaks
  Heating rate 2 K/min
  Amplitude 50 μm
  Frequency 10 Hz Static force of 0.2 N/0.3 mm film thickness (0.066 MPa)
10 mm film width
12.6 mm free length of test piece The tests show that the additional crosslinking increases the strength of the coating agent. The coating has a greater mechanical hardness. Furthermore it has high elasticity, even at elevated temperature.

The invention claimed is:

1. An article comprising at least one substrate and a curable coating agent comprising:
   (a) 30 to 80 wt. % of an atactic poly-alpha-olefin, which contains at least two alkoxysilane groups;
   (b) 5 to 40 wt. % of a radiation-activatable reaction product of (meth)acrylic acid with alcohols or with NCO-group containing compound;
   (c) 0.1 to 6 wt. % of a catalyst and an initiator, and
   (d) up to 50 wt. % of an auxiliary selected from the group consisting of a resin, adhesion promoter, stabilizer, pigment/filler, plasticizer, wax, thermoplastic polymer, water-binding agent and mixtures thereof; and
   wherein the curable coating agent is in a solid form at room temperature and is crosslinkable by an actinic radiation, and the total wt % adds to 100%;
   wherein the substrate is a wood or plastic; and
   wherein the curable coating agent has a viscosity of 3000-50000 mPas at 140° C.

2. The article of claim 1 wherein the curable coating agent is cured.

3. An article comprising:
   (1) at least one substrate;
   (2) a first curable coating agent comprising:
      (a) 30 to 80 wt. % of an atactic poly-alpha-olefin, which contains at least two alkoxysilane groups;
      (b) 5 to 40 wt. % of a radiation-activatable reaction product of (meth)acrylic acid with alcohols or with NCO-group containing compound;
      (c) 0.1 to 6 wt. % of a catalyst and an initiator, and
      (d) up to 50 wt. % of an auxiliary selected from the group consisting of a resin, adhesion promoter, stabilizer, pigment/filler, plasticizer, wax, thermoplastic polymer, water-binding agent and mixtures thereof;
      wherein the total wt % of the first curable coating agent adds to 100% and the first curable coating agent is in a solid form at room temperature;
   and
   (3) a second radiation-curable protective coating agent;
   wherein the first curable coating agent surface coats the substrate and the second radiation-curable protective coating agent is applied over the first curable coating agent; and
   wherein the first curable coating agents and the second curable coating agents are crosslinked together by actinic radiation.

4. The article according to claim 3, wherein the polyolefin is selected from the group consisting of modified polymers based on ethylene, propylene, butene, C4-C12-α-olefin prepared with metallocene, and mixtures thereof.

5. The article according to claim 3, wherein the polyolefin contains 1 to 10 wt. % of grafted alkoxysilane monomers.

6. The article according to claim 3, wherein the radiation-activatable reaction product of (meth)acrylic acid with alcohols or with NCO-group containing compound contains 1 to 5 radiation-reactive groups.

7. The article according to claim 3, wherein the first curable coating agent further comprises a low-molecular-weight compound having at least one alkoxysilane group and at least one unsaturated double bond.

8. The article according to claim 3, wherein the first curable coating agent contains 0.1 to 5 wt. % of initiators and 0.01 to 1 wt. % of catalysts.

9. The article according to claim 3, wherein the first curable coating agent has a viscosity of 1000 to 100,000 mPas at 140° C.

10. The article according to claim 3, wherein the first curable coating agent comprises:
    (a) 40 to 60 wt. % of the polyolefin;
    (b) 10 to 25 wt. % of the compound having (meth)acrylic groups;
    (c) 0.5 to 3 wt. % of catalysts and initiators; and
    (d) 5 to 20 wt. % of resins.

11. The article according to claim 10, wherein the first curable coating agent further comprises a water-binding additive.

12. The article according to claim 3, wherein the actinic radiation is a UV radiation.

13. A method of making the article of claim 3 comprising the sequential steps of:
    (a) applying the first curable coating agent onto the substrate to form a first layer;
    (b) cooling the first curable coating agent;
    (c) applying the second curable coating agents onto the cooled first layer to form a second layer; and
    (d) exposing the article to actinic radiation.

14. The method of making the article according to claim 13, wherein the thickness of the first layer is 5 to 250 μm.

15. The method of making the article according to claim 13, wherein the first curable coating agent comprises a pigment.

16. The method of making the article according to claim 13, wherein the substrate is a wood or plastic.

17. The method of making the article according to claim 13, wherein the first layer is applied at a temperature of 100 to 150° C. and the second layer at a temperature of 20 to 80° C.

* * * * *